March 25, 1969  R. A. HAWK, JR  3,434,708
TWO-STAGE RUBBER VEHICLE SUSPENSION
Filed Feb. 10, 1967

INVENTOR.
RAYMOND A. HAWK, JR.

BY his ATTORNEYS

United States Patent Office 3,434,708
Patented Mar. 25, 1969

3,434,708
TWO-STAGE RUBBER VEHICLE SUSPENSION
Raymond A. Hawk, Jr., Hokendauqua, Pa., assignor to Mack Truck, Inc., Allentown, Pa., a corporation of New York
Filed Feb. 10, 1967, Ser. No. 615,213
Int. Cl. B60g *11/22;* B61g *11/00;* F16f *1/36*
U.S. Cl. 267—63
4 Claims

ABSTRACT OF THE DISCLOSURE

In the particular embodiments of the invention described herein, a two-stage spring apparatus is provided for resiliently supporting a vehicle under variable load conditions including two spring members, one more readily compressible than the other, and a mechanism responsive to the varying loads for limiting the compression of the more readily compressible spring member and transferring the load to the less compressible spring member.

---

The present invention relates in general to vehicular spring suspension systems and, more particularly to novel and improved spring suspensions providing effective springing of a vehicle under a wide range of load conditions.

Vehicle suspensions composed of multiple metallic or rubber spring elements designed to operate under a wide range of loads, i.e., between an unloaded state and maximum load-carrying capacity, are well known and widely used. Usually such a spring suspension is relatively stiff and when the vehicle is in an unloaded condition it has hard or rough riding characteristics. The spring suspension becomes progressively more resistant to deflection as the vehicular load increases. In spring suspension designs where relatively flexible springing is provided for the vehicle in an unloaded condition, it is necessary to bring in progressively less resilient or heavier load-carrying elements as the load on the vehicle is increased in order to maintain proper spring support under such heavy load conditions. Inasmuch as the light or more flexible springs take part in the spring action of the suspension when the vehicle is heavily loaded, the lighter springs frequently are overflexed or compressed and may be damaged by overloading.

In accordance with the present invention, a spring suspension is provided which is composed of at least a spring assembly or unit, which is operative principally when the vehicle is unloaded or only lightly loaded and includes means for limiting the flexing of these springs when the vehicle is more heavily loaded and transfers the load to another spring assembly or unit which is constructed to operate effectively when the vehicle is loaded more heavily.

More particularly, in accordance with the invention, the spring suspension includes a first spring member which may be composed of a stack of resilient rubber pads which is supported by a second stack of less readily compressible or less resilient rubber pads, the more compressible stack of rubber pads being housed in a member which permits compression of the more resilient pads, up to a predetermined amount, and then transfers the load to the less resilient stack of rubber pads so that the less resilient stack carries the heavier loads without further compression of the more resilient stack of rubber pads. In this way the more resilient pads or springs are protected against over-compression when the vehicle is loaded heavily, thereby, greatly extending the range of load which can be carried by the vehicle without damage to the suspension while affording a more effective and comfortable springing and ride in the vehicle and under all conditions of loading.

Figure 1:
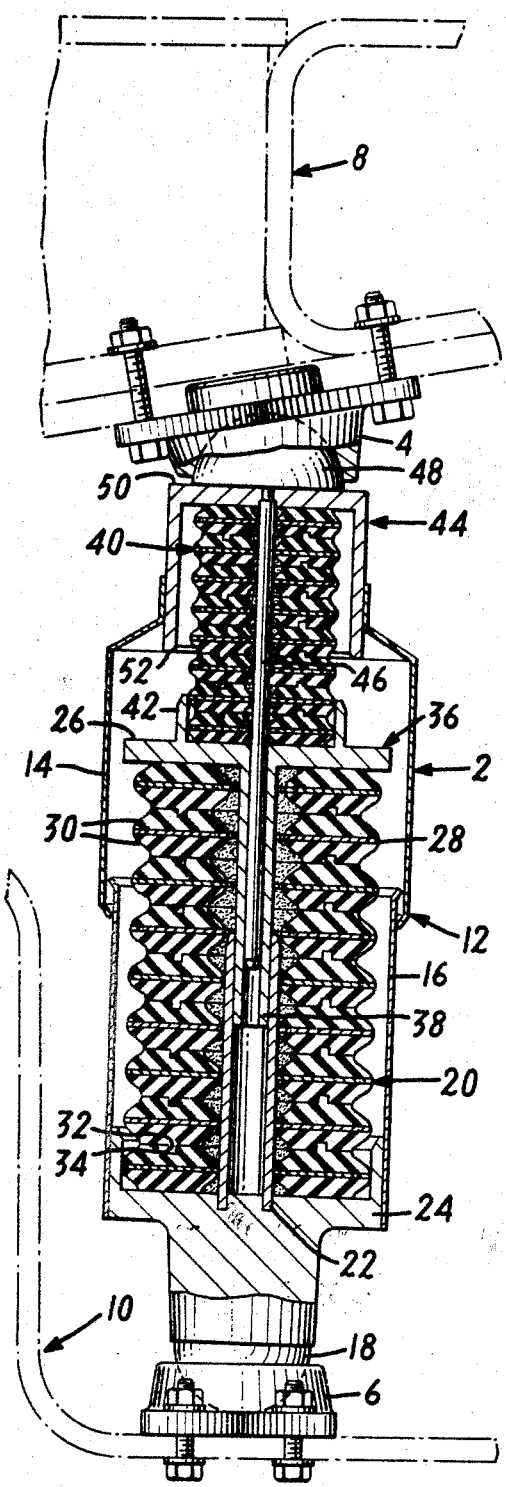
Figure 2:
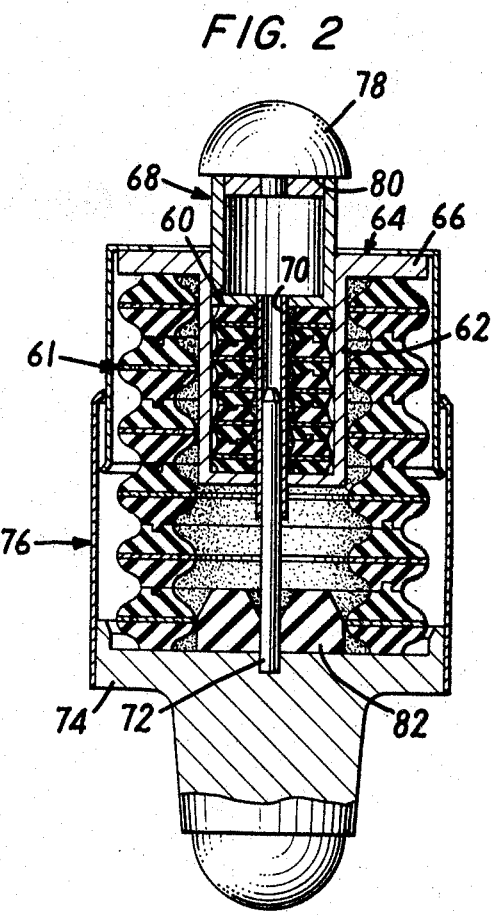

For a more complete understanding of the invention, reference may be had to the accompanying drawings, in which:

FIGURE 1 is a vertical sectional view of one embodiment of a spring mechanism in accordance with the invention, for suspending a rear axle relative to a vehicle frame; and FIGURE 2 is a vertical sectional view of another embodiment of the present invention.

In FIGURE 1, there is shown in an unloaded condition a spring suspension unit 2 embodying the invention mounted between a vehicle frame and a wheel supporting member. Two spherically recessed bearing members 4 and 6 are mounted, respectively, on the underside of the side frame member 8, and on a radius rod member 10 or other wheel mounting member such as an axle.

The spring assembly 2 includes a telescopic housing 12 having upper and lower housing sections 14 and 16 respectively. The lower housing section 16 has a hemispherical coupling 18 which is received within the bearing member 6. A first stack of a plurality of rubber springs or pads 20 is centrally positioned with relation to the housing section 16 by means of a centrally located guide tube 22 attached to a base 24 of the housing section 16, and a disk-like plunger 36 resting on top of the stacks of rubber pads 20 having a tubular stem 38 slidably received in the tubular guide tube 22. Supported on the upper surface 26 of the disk-like plunger 36 is a second stack of rubber pads or springs 40 which are more readily compressible than the rubber pads or springs 20. The lower portion of the stack of pads or springs 40 is received within the annular flange 42 extending upwardly from the upper surface 26 of the disk-like plunger 36. The upper portion of the stack 40 is received in the housing section 14 and in a downwardly opening cup-like member 44 located in the upper end of the housing section 14 and having a guide shaft 46 extending through the stack of rubber springs or pads 40 and slidably received in the tubular stem 38 of the disk-like plunger 36.

A second hemispherical coupling 48 is secured to the top 50 of the plunger 44 and is received within the bearing member 4.

The rubber springs or pads 20 and 40 may be of the type disclosed in Patents Nos. 2,686,677 and 3,087,765 or of other type. As illustrated each pad consists of a central metal plate 28 to the opposite sides of which rubber discs 30 are bonded. The disks have interfitting detents 32 are recesses 34 which constitute inter-engaging means for preventing rotational movement of one rubber pad with respect to another.

The stack of rubber pads 40 is designed with sufficient resiliency to support the vehicle with proper springing in a range from an unloaded state to a lightly loaded state. Under heavier or full loads, the stack of rubber pads 40 is compressed until the lower edge 52 of the cup-like plunger 44 engages the upper surface 26 of the disk-like plunger 36. Engagement of the edge 52 of the cup-like plunger 44 and the disk-like plunger 36 prevents further compression of the stack of rubber pads 40 so that the increased load is applied to the lower stack of rubber pads 20 and the stack of rubber pads 40 is protected from over-compression. The second stage rubber pads 20 then carry the weight of the loaded vehicle through a predetermined load range specifically designed for it.

Another embodiment of the invention is shown in FIGURE 2. The structure shown in FIGURE 2 is similar to that shown in FIGURE 1 except that the more readily compressible light springing stack of rubber pads 60 is disposed concentrically within the heavy springing stack of rubber pads 61 and within a cup-like portion 62 of the plunger 64 which includes a flange 66 resting on the heavy load bearing stack of pads 61. An upwardly opening cup-like plunger 68 rests on top of the stack of rubber pads 60 and has a tubular shaft 70 extending through the center of the stack of rubber pads 60 and slidably through the bottom of the cup-like portion 62 of the plunger 64. A center guide stem 72 extending upwardly from the base 74 of the housing 76 is slidably received in the tubular shaft 70. A hemispherical coupling 78 is secured in the open upper end 80 of the plunger 68 and has a diameter which exceeds that of the plunger 68. A rubber bump-stop 82 which surrounds the center guide stem 72 is secured to the base 74 of the two-piece telescopic housing 76.

In operation the more readily compressible stack of rubber pads 60 is designed with sufficient resiliency to support the vehicle with proper springing while the vehicle is unloaded or only partially loaded. Under heavier loads, the hemispherical coupling 78 is forced downwardly into engagement bottoming out with the plunger 64 thereby transfering the load to the heavy load bearing stack of rubber pads 61. The engagement of the hemispherical coupling 78 with the plunger 64 prevents over compression of the more readily compressible stack of rubber pads 60 by limiting the extent to which these stacks 60 can be compressed. Similarly, the rubber bump-stop 82 protects the heavy load bearing stack of rubber pads 61 from over compression by limiting the extent to which the pads 61 can be compressed while cushioning the bump out effect.

It will be understood by those skilled in the art that the above-described embodiments are meant to be exemplary and that they are susceptible to modification and variation without departing from the spirit and scope of the invention.

I claim:
1. A two stage spring mechanism for resiliently supporting a first member relative to a second member under variable load conditions comprising
  a first stack of resilient rubber pads compressible under a first range of loads,
  a second stack of less resilient rubber pads compressible under a second range of heavier loads supporting said first stack of pads,
  a first plunger interposed between adjacent ends of said first and second stacks of resilient rubber pads,
  a first housing mounted on one of said first and second members and including a second cup-like plunger,
  said second cup-like plunger receiving said first stack of pads and engaging the end of said first stack remote from said first plunger, said second cup-like plunger engaging said first plunger when a predetermined load level is reached, thereby limiting compression of said first stack of pads and transferring the load to said second stack of pads,
  a second housing mounted on the other of said first and second members and receiving said second stack of pads, said second housing engaging the end of said second stack remote from said first plunger, said first and second housings being telescopically related to permit relative movement therebetween,
  a first guide member mounted on said second plunger extending toward said second housing and coupled to said first plunger, and
  a second guide member mounted on said second housing extending toward said second plunger and coupled to said first plunger, said first and second guide members being coupled together.

2. A two stage spring mechanism for resiliently supporting a first member relative to a second member under variable load conditions comprising
  a first stack of resilient rubber pads compressible under a first range of loads,
  a second stack of less resilient rubber pads compressible under a second range of heavier loads supporting said first stack of pads,
  a first plunger engaging one end of said second stack of less resilient rubber pads and having a tubular portion receiving and having a bottom supporting one end of said first stack of pads, said tubular portion having an open end opposite said bottom,
  a second plunger mounted on one of said first and second members extending through said open end of and slidably received in said tubular portion of said first plunger, said second plunger engaging the other end of said first stack of pads and having means for engaging said first plunger when a predetermined load level is reached, thereby limiting compression of said first stack of pads and transferring the load to said second stack of pads, and
  a pair of telescopicably related housings arranged for relative movement therebetween and disposed to enclose said first and second stacks of pads, one of said telescopicably related housings being mounted on the other of said first and second members and engaging the end of said second stack remote from said first plunger.

3. The spring mechanism according to claim 2, including a first guide member mounted on said second plunger extending toward said one housing and coupled to said first plunger, and a second guide member mounted on said one housing extending toward said second plunger and coupled to said first plunger, said first and second guide members being coupled together.

4. The spring mechaanism according to claim 2, including resilient means mounted on said one housing for engaging said first plunger to limit the compression of said second stack of pads.

References Cited

UNITED STATES PATENTS

| | | | |
|---|---|---|---|
| 1,825,093 | 9/1931 | Sansburn | 267—60 |
| 2,493,026 | 1/1950 | Pointer | 267—60 |
| 2,660,423 | 11/1953 | Roy | 267—33 |
| 2,686,667 | 8/1954 | Willison et al. | |
| 2,982,536 | 5/1961 | Kordes. | |
| 3,258,134 | 6/1966 | Nicolas | 267—33 |

DRAYTON E. HOFFMAN, *Primary Examiner.*

U.S. Cl. X.R.

213—40, 45; 267—1